United States Patent
Birgerson

[11] Patent Number: 6,138,009
[45] Date of Patent: Oct. 24, 2000

[54] SYSTEM AND METHOD FOR CUSTOMIZING WIRELESS COMMUNICATION UNITS

[75] Inventor: Joakim Birgerson, Löddeköpinge, Sweden

[73] Assignee: Telefonaktiebolaget LM Ericsson, Stockholm, Sweden

[21] Appl. No.: 09/097,942

[22] Filed: Jun. 16, 1998

[30] Foreign Application Priority Data

Jun. 17, 1997 [SE] Sweden .................................. 9702322

[51] Int. Cl.[7] ..................................................... H04M 3/00
[52] U.S. Cl. .......................... 455/419; 370/338; 370/401; 713/2; 701/200
[58] Field of Search .................................... 455/419, 418, 455/414, 456, 403, 422; 370/338, 401, 352, 402–404, 313; 701/211, 213, 24, 300, 200; 342/457, 357.01, 357.06, 357.09, 357.1, 357.13; 709/229; 713/2; 379/58.17, 201

[56] References Cited

U.S. PATENT DOCUMENTS

| | | |
|---|---|---|
| 5,046,082 | 9/1991 | Zicker et al. . |
| 5,546,077 | 8/1996 | Lipp et al. . |
| 5,802,159 | 9/1998 | Smolentzov et al. . |

FOREIGN PATENT DOCUMENTS

| | | |
|---|---|---|
| 0 459 344 | 12/1991 | European Pat. Off. . |
| 0 583 077 | 2/1994 | European Pat. Off. . |
| 0 804 045 | 10/1997 | European Pat. Off. . |
| 43 21 381 | 1/1995 | Germany . |
| 7067174 | 10/1995 | Japan . |
| 96/32679 | 10/1996 | WIPO . |
| 97/13382 | 4/1997 | WIPO . |

OTHER PUBLICATIONS

"Marimba Castanet", Apr. 4, 1997, pp. 1–6.
"Marimba", May 28, 1997, pp. 1–5.
"Ericsson selects Marimba as partner in Internet technology expansion", Marimba, Apr. 29, 1997, pp. 1–2.
"The Java Language: An Overview", Apr. 26, 1997, pp. 1–6.
Wayner, Peter, "Sun Gambleson Java Chips", *State of the Art*, Nov. 1996, pp. 79–88.

*Primary Examiner*—Nay Maung
*Assistant Examiner*—Tracy M. Legree
*Attorney, Agent, or Firm*—Burns, Doane, Swecker & Mathis, L.L.P.

[57] ABSTRACT

A system and a method respectively for customizing wireless communication units for use in wireless communication systems. The wireless communication units are generic and include a device for enabling establishment of contact with a switching arrangement and a handling device including a program executor. Software relating to the wireless communication units is provided in a number of storing devices accessible over a global data communications network. Location information is provided, and, with use of the location information, software relating to a particular generic communication unit is downloaded via the switching arrangement using the global data communications network to the communication unit.

31 Claims, 9 Drawing Sheets

SYSTEM AND METHOD FOR CUSTOMIZING WIRELESS COMMUNICATION UNITS

BACKGROUND

The present invention relates to a system and a method respectively for customizing wireless, generic communication units. The invention also relates to a generic, wireless communication unit.

The use of wireless communication units, such as for example cellular telephones is increasing rapidly all over the world. This means that the number of destination markets is growing steadily. The markets differ from one another in a number of aspects since different languages are used, different cultural aspects have to be taken into account etc. and also in other respects various needs and demands have to be taken into account. This complicates the situation for manufacturers of wireless communication units since for every market, different software sets for the communication units intended for the respective particular markets have to be provided, which causes complex and continuously changing situations since the markets are continuously evolving. The appropriate software intended for a particular market has to be introduced into communication units intended for each specific market and it is also a tendency to more specifique local adaptations of the telephones which necessitates the generation of even more particularly adapted software sets. Communication units, such as for example cellular telephones, also tend to get more and more complicated to handle for a user in order to enable for increasing ability to provide for adaptation to user specific needs and services. Therefore for example cellular telephones get more and more similar to computers and allow a high degree of programmability. A common problem today is that the users do not bother about all the functionalities and services that actually are provided for through the telephones, since it is too complicated, which means that the provision of adaptation possibilities and service offers are not taken advantage of to an extent that corresponds to the intention of the telephone manufacturers, service providers etc.

U.S. Pat. No. 5,046,082 shows a system permitting remote access to cellular telephone RACT programming through PSTN. Operational data are stored in the remote access cellular telephone and it comprises an erasable memory for storing such operational data and processing means connected to the memory which is programmed to manipulate the operational data, an audio bus for transmission of audio frequency signals and a modem comprising an audio part connected to the bus and a data part connected to the processing means. The modem is operable to communicate data between the processing means and said audio bus. The system furthermore comprises signal detection means for detecting audio signals having predetermined parameters. This invention relates to the internal structure of the telephone and it is intended for analogue systems and thus does not solve the problems of providing a wide flexibility, simple telephones and particularly it does not relate to digital communication systems.

JP-A-7 067 174 shows a digital mobile telephone system including a downloading function for extended software and DE-A-4 321 381 discusses downloading of new or altered software into a memory of a telephone using a personal computer. WO 96/32679 relates to updating of software in mobile telephones. Managing hosts and an enchanced service complex are used for providing the update. However, none of these documents shows a really personally adapted or market adapted telephone which is easy to fabricate and handle, e.g. to distribute, for the manufacturer and easy and flexible to handle for the user.

SUMMARY

What as needed is therefore a system and a method respectively for customizing wireless communication units such as for example cellular telephones, cordless telephones, any kind of hybrid communication units etc.

A system and a method are also needed through which the fabrication of communication units intended for a number of different markets, required to fulfil a number of different needs and implementations, is facilitated, made more efficient and cost-effective. A system and a method respectively are also needed through which local implementation requirements and niching of the communication units can be still further increased without affecting the fabrication process, distribution of communication units etc.

Still more particularly a system and a method respectively are needed through which the basic functionality can be altered, updated in an efficient and uncomplicated manner and without producing complications for the end-user, i.e. the subscriber or the user, of a communication unit. Still more particularly a system and a method respectively are needed through which the end-user in a non-complicated and efficient manner gets access to available service implementations existing locally on a market and also to newly introduced services or even services and applications not yet introduced on the market.

A communication unit intended for wireless communications such as a cellular telephone, cordless telephone, any kind of a hybrid communication unit etc is also needed which to a high extent is customizable without producing complications neither for the end-user, nor for the manufacturer, which easily can be updated and through which the services available on the market, as well as unforseeable services that might be introduced or made available, can be provided without imposing on the user to keep himself informed about improvements, updates can be introduced also without requiring from the user to have knowledge about how to program his communication unit.

Therefore a system for customizing wireless communication units to be used in a wireless communication system, including a number of switching arrangements arranged throughout the coverage area of the wireless communication system, is provided. Each communication unit comprises means for enabling establishment of contact with a switching arrangement. The communication units are generic and the software relating to wireless communication units is provided in a number of storing means that can be accessed over a global data communication network. Each generic communication unit includes indicating means for indicating to a switching arrangement, or a communication means communicating with the switching arrangement, when contact is established (e.g. the first time of contact), that software is requested. Each generic communication unit furthermore comprises handling means for processing the software. The switching arrangement or the communication means provides information relating to the location of the communication unit (or simply of the switching arrangement itself) and with the use of said location information, software relating to a particular generic communication unit is downloaded to the communication unit via said communication means or switching arrangement using the global data communications network.

In a particular embodiment software relating to generic communication units is stored in a plurality of databases comprising a master database and a number of replicated databases which are accessible via the global data communications network. Single sourcing can be implemented in different ways. In one embodiment all relevant software is provided in a master database which is directly accessed. Alternatively a number of replicated databases are provided which can be accessed.

In an advantageous embodiment a plurality of the communication means, or the switching arrangements themselves, include means for holding software replicated from the databases. Advantageously said means, which are provided in the switching arrangements or in communication means connecting thereto, are replicated software databases.

In a particular embodiment the indicating means are included in the communication unit activating means themselves such that, the first time a communication unit is activated, software is automatically requested. According to different embodiments it does not have to be the first time, or does not have to be only the first time but there can be provided for request activating means which indicate when software is requested and particularly through which is pointed out when software is required which is necessary for the functioning of the telecommunication unit, also called customized basic software, as opposed to basic software which is software that is common for every telecommunication unit irrespectively of where and how it is to be used. In an alternative embodiment the indicating means are separate from the activating means. However, activation of the telecommunication unit is required in order to obtain the location information, and possibly some other information, which is provided by the switching arrangement or the communication means.

In a particularly advantageous embodiment the communication means comprises the switching arrangement itself. Advantageously the switching arrangements are the base stations of the mobile communication system. When a communication unit is activated, contact is established with the closest, or an adjacent, base station. In some particular cases, a user of a communication unit wants to be provided with software that does not correspond to the location of the closest, or an adjacent, base station. A user may for example buy a communication unit in a country which is not his home country, using a different language etc. The desired customization can then be provided for in different ways. The master database (and advantageously also replicated databases) keeps all relevant software, irrespectively of locality, and via the indicating means a selection can be done relating to language etc. This means that the datacommunications network is used: In an advantageous embodiment means for user interaction is provided. In an alternative embodiment the telecommunications network is used to find the "home" switching arrangement in which the location information is provided and thus the relevant software is downloaded.

Advantageously the global communication network is Internet and when a communication unit is activated, a TCP/IP (Transmission Control Protocol/Internet Protocol) channel is setup between the communication unit and a switching arrangement, such as for example the closest base station. A software transferring means, e.g. a file transfer protocol PTP is advantageously used for transferring software to the communication unit. When software is requested (automatically or by user interaction) by a communication unit, the switching arrangement, or particularly the base station, is provided with information relating to the communication unit such as for example identity, e.g. IMSI (International Mobile Subscriber Identity), PIN (Personal Identification Number), model etc. In one embodiment so called pull technique is used for loading down customized (basic) software to the communication unit. In a particular embodiment the switching arrangement, such as for example the base station, contains information about a number of databases for routing a query to an appropriate database relating to the software request made by a communication unit. Advantageously the switching arrangement, particularly the base station, sends a database query to a replicated database arranged locally in the base station.

In a particularly advantageous embodiment applications are downloaded to the communication unit. The application receives and manages applications and/or content to be delivered to the communication unit using the global data communication network, said applications having been selected by the communication unit user. In a particular embodiment applications can be downloaded without the customized basic functionality being downloaded according to the invention but being provided for in any conventional manner. Irrespectively of whether the customized basic software is downloaded according to the inventive concept or in some other way, selected software applications/content is dynamically, automatically or via user interaction, provided to the communication unit using push technique. Irrespectively of whether the basic customized software is provided using the inventive concept or any other known concept, the customized basic software as well as the basic software that is necessary for the functioning of the telephones, can be dynamically and advantageously automatically updated/modified via push technique. In one advantageous embodiment of the invention, handling means provided in the communication unit comprises a JAVA™ chip. In a particularly advantageous embodiment Castanet™ tuners are/can be downloaded to storing means provided in the communication unit, which can be executed by the handling means, e.g. a Java chip. In a particularly advantageous embodiment the switching arrangement, such as for example the base station, is provided with serving means, e.g. a Castanet proxy whereas a Castanet transmitting means, e.g. a Castanet transmitter and a number of repeaters distribute and manage a number of channels, i.e. application or content to be distributed across the data communication network, for example Internet, towards the communication unit. E.g. Castanet™ (of marimba™) is available (on Apr. 29, 1997) at www.marimba.com/datasheets/castanet and the content is herewith incorporated herein by reference.

In an alternative embodiment generic handling means are pre-programmed in the communication unit and push technique is used for downloading of software, customized basic software as well as applications, alterations, automatic, dynamic updates new software. The generic handling means can be customer adapted via user interaction or alternatively adaptation can be provided for by the switching arrangement, particularly the base station, after software has been downloaded to the communication unit. In a particularly advantageous embodiment the generic handling means comprises a Castanet™ tuner, software being accessible directly via a Castanet transmitter and a number of repeaters Advantageously the basic functionality is automatically and/or dynamically updated/upgraded/modified using the global data communication network, for example Internet. Advantageously the customized basic functionality is updated etc. in the same manner. Particularly a default tuner is installed at the fabrication stage, which can replace itself when the communication unit is activated, i.e. a customized tuner is downloaded replacing the generic default tuner.

In a particularly advantageous embodiment the JAVA™-programming language is used and services can be downloaded as well as applications and so called JAVA applets, c.f. for example "Are JAVA chips better than general purpose CPUs? Or will new compilers make them obsolete?, Peter Wayner, November 1996, BYTE p. 79–83", which herewith is incorporated herein by reference. The Java™ Language: An Overview is available on Apr. 26, 1997 over the World Wide Web.

The invention also provides for a method of customizing a generic communication unit for use in a mobile communication system. The method comprises the steps of establishing contact between the communication unit and a switching arrangement of the mobile communication system, setting up a communication channel between the communication unit and the switching arrangement intended for software transfer, providing location information relevant to the generic communication unit and via said switching arrangement downloading software to the communication unit over a global data communications network, and in handling means in the mobile communications unit processing the downloaded software. In an advantageous embodiment the method comprises the steps of, providing a request for software, i.e. customized basic software, the first time the communication unit is activated or alternatively when an indication is provided that software is needed. In one embodiment downloading of customized basic software to the communication unit is performed using the pull technique, whereas for dynamic (automatic) downloading of updates/modifications to basic software as well as to customized basic software, the push technique is used. Altneratively the push technique is used for downloading of customized basic software as well. The push technique is also used for downloading of applications, services etc. subscribed to as well as new software, new applications etc.

Therefore also a communication unit, such as for example a cellular telephone, a cordless telephone, or a hybrid communication unit is provided which comprises basic functionality software and means enabling contact to be established with a switching arrangement, such as for example a base station, and handling means for receiving and managing customized basic software and applications/contents selected by the user of the communication unit. Advantageously the handling means comprises program executing means. In a particularly advantageous embodiment the telephone includes handling means comprising a JAVA™-chip. However, of course also other programming languages can be used, the essential being that the communication unit comprises program executing means for executing programs downloaded through a global communication network such as Internet. In an alternative embodiment an intranet can be used.

It is an advantage of the invention that wireless communication units, such as for example cellular telephones or cordless telephones, can be manufactured generically independently of which is the intended market and adjust themselves on the destination market or to the "home" market either on site or by pointing out which is the home market or which are the desired features. It is also an advantage of the invention that the manufacturing process is facilitated since a generic communication unit is manufactured without requiring separate storing facilities and without the need for provision of new software each time a new, and different, market is introduced. It is also an advantage of the invention that customized basic software as well as back-end functionality, functions essential to the performance of the communication unit in the communication system, and which is set during manufacturing, can be dynamically updated either without any interaction of the user or manufacturer at all, or through simple interactive commands. It is also an advantage that a user can subscribe to services and applications which are automatically provided access to without requiring from the user to perform any programming or complicated steps etc.

BRIEF DESCRIPTION OF THE DRAWINGS

The invention will in the following be further described in a non-limiting way and with reference to the accompanying drawings in which.

DETAILED DESCRIPTION

Figure 1:
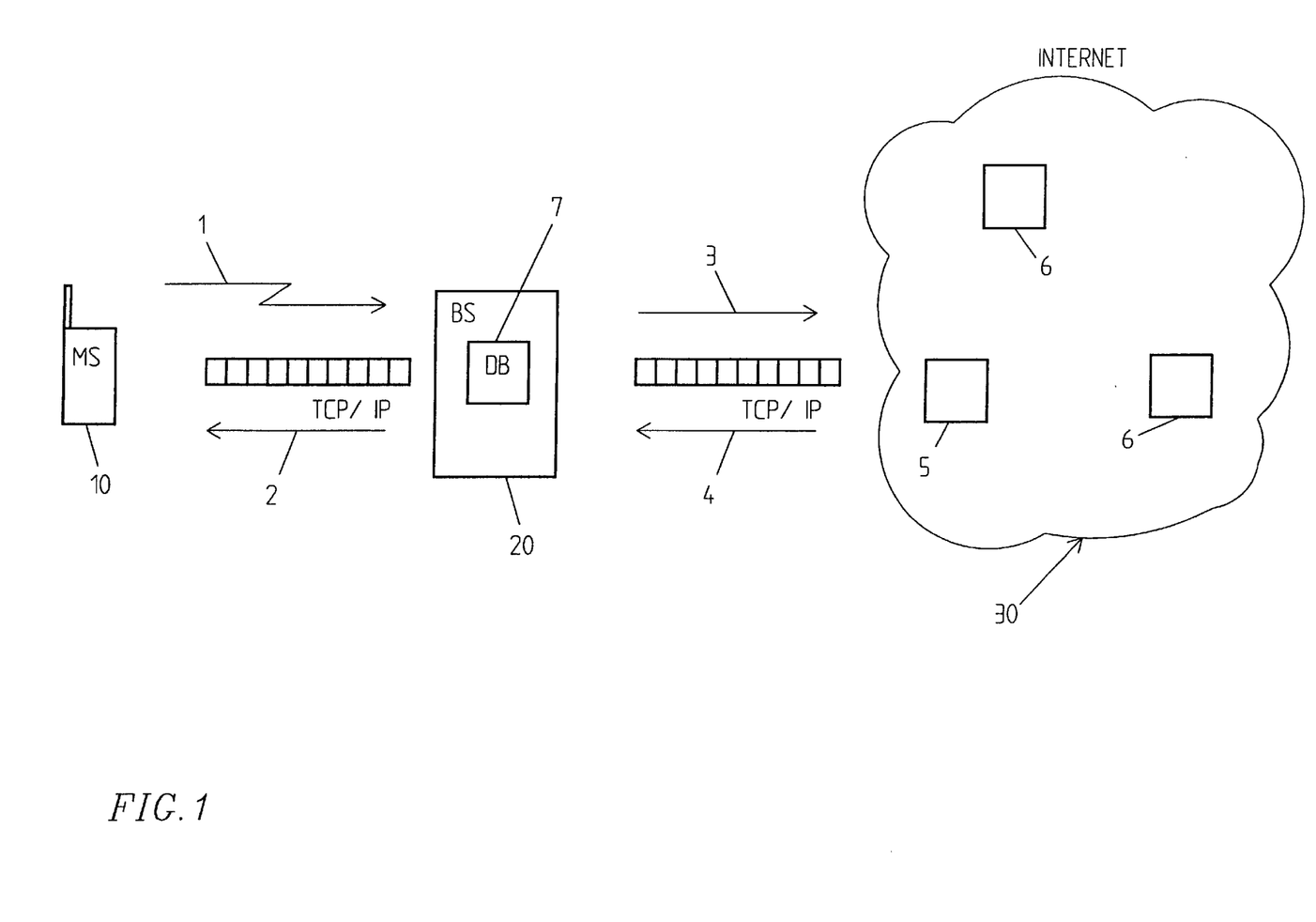
FIG. 1 schematically illustrates downloading of customized basic software according to one embodiment of the invention, FIG. 2 schematically illustrates downloading of software using push technique to a communication unit in which customized basic software has been downloaded according to FIG. 1, FIG. 3 schematically illustrates a communication unit to which customized basic software as well as new and/or updating software and/or services, applications are downloaded using push technique.

In FIG. 1 the communication unit is supposed to be a cellular telephone (MS) 10. It should however be clear that it also can be a cordless telephone, some kind of a hybrid telephone or any other kind of communication unit The cellular telephone is used in a cellular communication system of which only a base station 20 is illustrated for reasons of clarity, and since, in this embodiment, the base station is the only part of the cellular communication system that is essential. Although the base station 20 here merely is illustrated as a base station, it should be clear that the invention of course also applies to the GSM system in which case a base station comprises a base station controller (BSC) which is connected to a base transceiver station (BTS). The cellular telephone 10 is generic which means that before customized basic software is installed, it could be used anywhere, with any kind of software etc. Advantageously the only software that initially is contained in the telephone is the minimum of software required in order to establish contact with for example a base station, some control logic etc.

According to an advantageous implementation of the invention, a batch of cellular telephones are for example fabricated in a first country. Since the telephones are generic the manufacturer does not have to bother about the destinations for the cellular telephones since the same generic telephone can be used everywhere and is locally adapted on site, i.e. in the destination country or in the destination region or any other particular area. Still further, a telephone can be provided with any desired software irrespectively of where it is actually activated. Then, however, the desired features, e.g. language etc. must be indicated using a scheme or similar. Alternatively some information relating to country, region or similar, is provided and the particulars associated with said region, country etc. are automatically provided, i.e. the appropriate software is downloaded.

In FIG. 1 it is supposed that the cellular telephone has been distributed to a country/region or whatever given location, where it is to be registered. The cellular telephone 10 is switched on, or activated. The cellular telephone then, in a conventional manner, finds (1) the closest base station 20. According to the invention a channel (2) is set-up between the cellular telephone and the base station 20, which comprises a protocol enabling the transfer of software. In this particular embodiment Internet is used as a global data communication network 30 for downloading of software. The invention is however not limited to using Internet; in alternative embodiments, global, in the sense that they cover a desired area, networks, e.g. intranets can be used as an alternative to Internet. They can also be used in combination with Internet. Other global or future data communication networks can of course also be used; the principle remains the same. However, if Internet is used as a global data communication network, the channel set-up between the cellular telephone 10 and the base station 20 is e.g. a TCP/IP channel (Transmission Control Protocol/Internet Protocol). TCP/IP also comprises a number of sub-protocols such as for example Small Message Transfer Protocol (SMTP) for E-mail, file transfer protocol (FTP) etc. Via the software transferring protocol, e.g. FTP, files can be transferred to the cellular telephone 10. When the telephone is switched on or activated and has found the closest base station, the cellular telephone 10 provides the base station 20 with identification information e.g. containing the model of the telephone, IMSI (International Mobile Subscriber Identity), PIN etc. and it also informs the base station 20 that it requests software, i.e. here customized basic software. These procedures in an advantageous embodiment take place automatically. In an alternative embodiment user interaction is required, e.g. the user activates indicating means to inform the base station that software is requested. A particular command may be provided to indicate that customized basic software is requested etc. As referred to earlier, basic functionality, i.e. back-end functionality relating to functions which are vital to the performance of the telephone in the system, may be provided during manufacturing; what is requested is thus the front-end functionality herein referred to as the customized basic functionality, such as for example locally adjusted menues, languages etc. also relating to all local particular adaptations of the phone that are available (locally) and that will be, or may be, available in the future.

When the base station 20 has received the information given by the cellular telephone, it provides the local or geographical parameters of the base station. Different kinds information can here be provided, some optional parameters can be provided etc. The relevant parameters can also be provided via separate communication means connected to the base station, or included in the base station. The base station 20, or the communication means, uses the information from the cellular telephone 10 and the additional location information and sends a query via TCP/IP 3 to a local software database 7, if such is provided for in the base station 20 or is connected to the base station. The base station 20 or the communication means in the illustrated embodiment contains a replicated software database 7 being a replication of a software database 5 available over Internet. In a particular embodiment there is just one master software database 5 which is accessed, but in an alternative embodiment a number of replicas 6 of the master software database 5 are provided which are accessible via Internet. In the latter case a higher degree of redundancy is provided. When a replicated software database 7 is provided in, or in connection to, the base station 20, no access via the telecommunications network is required when the cellular telephone 10 requests software.

If however no local software database 7 is available, the query is transferred to an appropriate software database according to a scheme or a database table (not shown) provided in the base station 20. Such a table can be provided for in many different ways as long as the information is provided. The requested customized basic functionality is then downloaded 4,2 via the global data communications network, here Internet, via the base station 20 to the cellular telephone 10, where it is activated. The base station 20 comprises handling means (not shown) for serving/routing queries to databases and software to the telephone.

The telephone 10 comprises handling means including program executing means. The telephone will be further discussed with reference to FIG. 4

In an advantageous embodiment the JAVA™ programming language by Sun Microsystems, see for example "The JAVA™ language: An overview" of Javasoft which was incorporated herein by reference, is used. The JAVA-concept comprises programming-language generating applications, and JAVA applets. Advantageously the handling means comprises a JAVA chip which is integrated into the cellular telephone. JAVA chips are discussed in Byte, November 1996, page 79–88, "SUN gambles on JAVA chips" by Peter Wayner as discussed above. A JAVA chip is a dedicated JAVA processor, which, like so called pico JAVA chips, based on Suns pico JAVA core architecture, natively understand JAVA byte code without the overhead of an interpreter or just in time (JIT) compiler. A JAVA chip executes JAVA byte code without converting it into another CPU instruction and it does not need any extra memory or cache space (that is required when a general purpose processor runs a job with a byte code interpreter or a just in time compiler). JAVA has an extensive amount of routines for coping easily with TCP/IP protocols like HTTP and FTP. Of course some other programming language providing a similar functionality can also be used.

In an advantageous embodiment the software database comprises Castanet™, of Marimba™, tuners. Castanet™ is used for distributing and maintaining software applications and content across Internet and to dynamically provide updated information automatically. A Castanet tuner is an application which monitors, receives and manages channels selected by a channel subscriber. A Castanet channel is any application or content that can be distributed across Internet or an intranet. A Castanet transmitter is an application running on a network server managing the distribution and maintenance of channels. Through the implementation of an application as a Castanet channel, the downloading of the software is given flexibility in development and distribution while providing subscribers with an application that will automatically improve over time when new features are added. Channels are stored locally. Castanet comprises a tuner client and a transmitter server wherein the tuner enables end-users to subscribe to application channels deployed by various transmitters across Internet or cooperate networks. Which tuner (in the software database) that is loaded, is given by the geographical (or other) parameters) and the base station tunes or decides which channels the tuner subscribes to via default (automatic) subscription. If the Castanet™ concept is used, advantageously Castanet's Application Distribution Protocol (ADP) for mirroring code and data over a network connection is used as a protocol for software transfer, i.e. it is one example on an alternative to FTP ADP is briefly discussed in "marimba", available on May 28, 1997 over www.marimba.com/press/castanet-net.7. Using Castanet™, channel applications are enabled to communicate data back to the server, the transmitter. Via the ADP protocol software is updated in, very close to, realtime, requiring very little bandwidth. It should be noted that not only JAVA code can be run, but also e.g. DLL:s (Dynamic Link Library), C,C++ objects can be deployed and managed.

Figure 2:
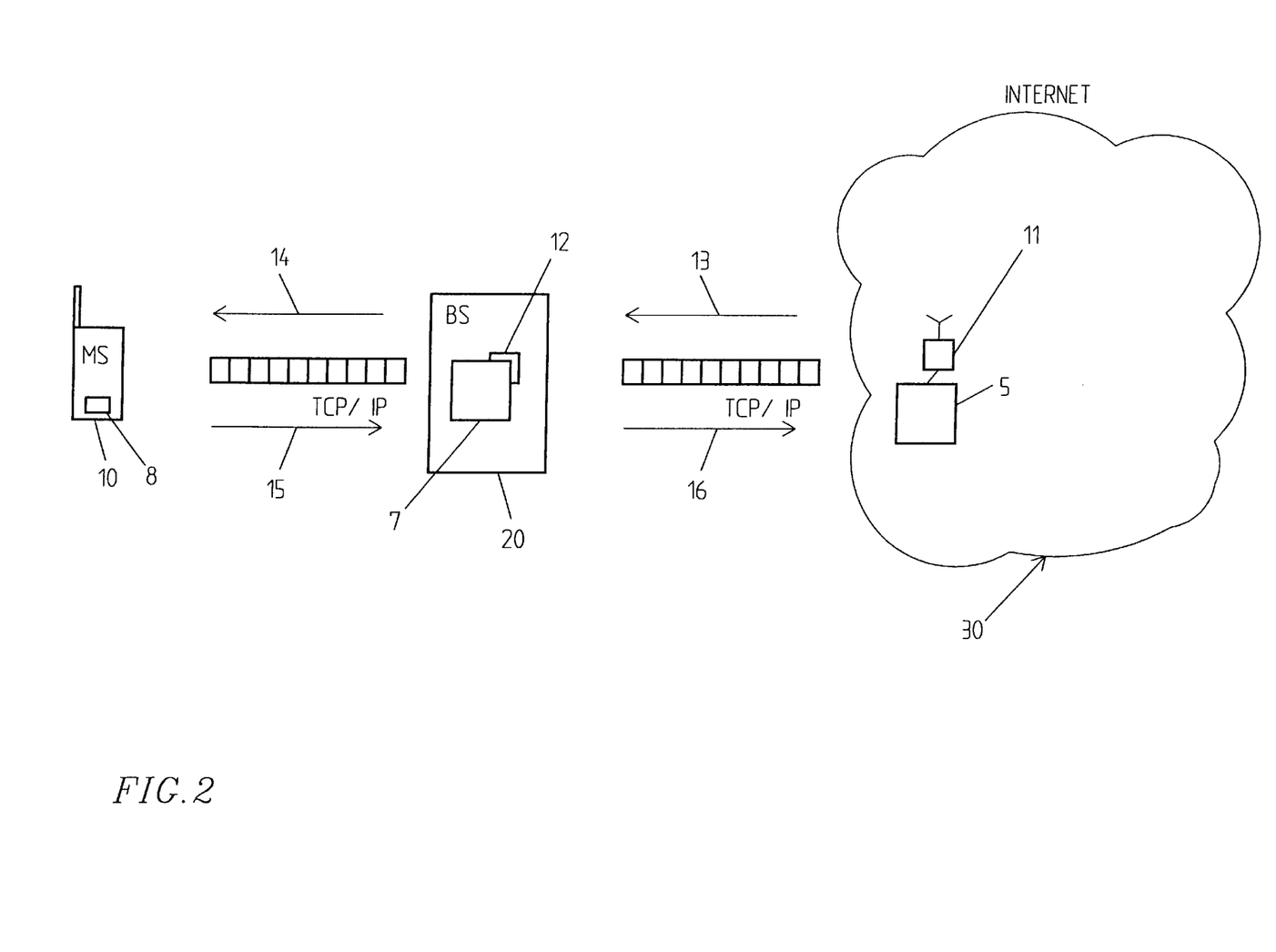

In FIG. 2 an embodiment is illustrated according to which push technique is used for downloading of updating software and/or applications and/or entirely new software a user may subscribe to (and/or services). The cellular telephone 10 comprises storing and handling means 8 for receiving locally adapted and/or demanded software over one or more channels 13,14 defined in the handling means 8. Advantageously a number of different services are available to the subscriber/user. The services are according to one embodiment of the invention downloaded as applications which are small and contain interfaces, protocols etc. that are required to reach third party content providers. In a particular embodiment the applications are the above mentioned JAVA applets or applications. These services, the customized basic functions as well as the basic functions are advantageously (dynamically) updated with or without user interaction i.e. either requiring user interaction or automatically as in the push technique. An example of the push technique is Castanet as referred to above.

According to the invention a number of sources, e.g. databases and transmitting means and possibly also repeating means, are provided for distributing and maintaining channels towards available customers, e.g. cellular telephone 10. In an advantageous embodiment Castanet™ transmitters and repeaters are used. In a particularly advantageous embodiment serving means, e.g. a Castanet Proxy Server 12 is arranged in the base station 20 to provide for particularly fast access and for saving of bandwidth. Database replicas are then provided, and software is obtainable directly from the serving means 12

The cellular telephone 10 here receives locally adapted software through a software transferring protocol, e.g. FTP or Castanet ADP, in the channel(S) which are defined in for example a downloaded Castanet tuner. Advantageously the handling means or program executing means, 8 comprises a JAVA chip. The cellular telephone 10 informs the base station 20 and source that it is accessible, 15,16 which means that, for example, the downloaded tuner in the cellular telephone makes a query to the source 15,11. Feedback information from the cellular telephone 10, i.e. the user, to the transmitter 11, is also enabled. The software database 5 as implemented in the present embodiment among others comprises a number of Castanet tuners. Which tuner that is loaded is given by the location information parameter in the base-station 20 which in turn also decides which particular channels the tuner automatically subscribes to. Examples of Castanet channels are a Castanet tuner through which the tuner can update/replace itself, language channels enabling a language and/or culture adaptation according to a geographic parameter or parameters, routines and telephone functionalities etc. Examples on services that can be provided are E-mail, browsing, database access, system integration, bank and financial services (with integration of the PIN-code), news and weather broadcast and other broadcasts. Using the concept of the invention, interactive communication to individuals is enabled which among others can be used for market inquiries etc.

Figure 3:
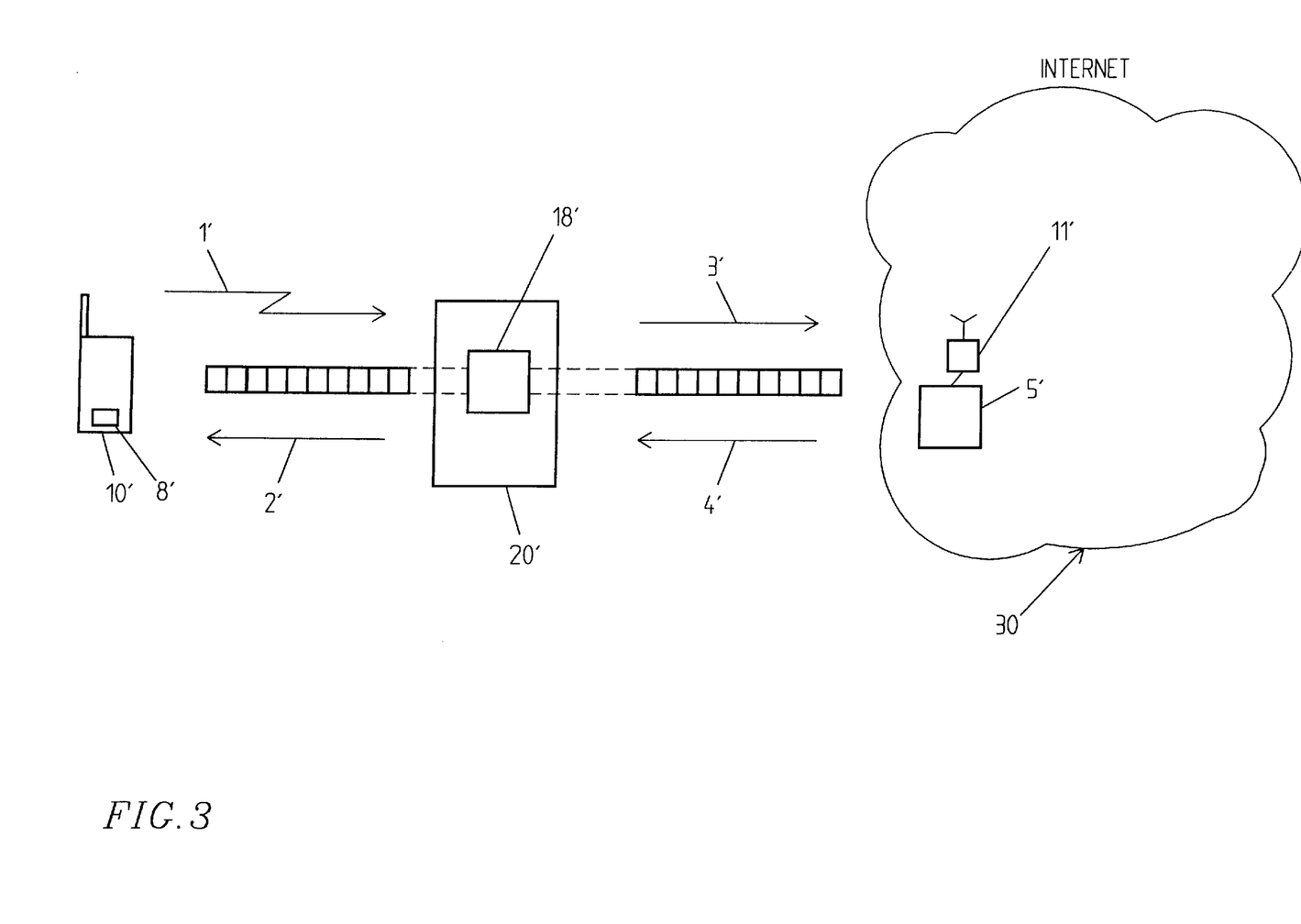

FIG. 3 relates to an embodiment in which handling means are pre-programmed in the cellular telephone 10' when it is manufactured. The handling means 8' can be adapted by the user, who for example answers a number of questions controlling which channels that are to be requested. Alternatively the information controlling or adapting the pre-programming can be provided by the base station 20', for example the closest base station, when a contact first is established between the cellular telephone and the base station. The functioning is substantially the same as that described able with reference to FIG. 2, with the difference that the software only has to be accessible from the source 5' by a central transmitter 11' and possible repeaters (not shown); for example a Castanet transmitter and repeaters. No pull database in the base station, for example comprising Castanet tuners, is needed. In this case push technique is thus used both for loading down of customized basic software as well as services, applications, updates and new or additional software.

In FIG. 3 the preprogrammed handling means 8' are adapted by the user. When the telephone 10' is activated, the base station 20' adds location information and channels for transfer of software 2',4' are set-up. The base station does in this embodiment not comprise any replicated database and software is transferred, using the global data communication network, from the source, database 5' by transmitting means 11'. Queries/software is routed etc. via serving/routing means 18'. Of course a number of repeating means may be provided although not explicitly shown in FIG. 3.

In a particular embodiment a default Castanet tuner (or similar means) are provided initially, i.e. before downloading of customized basic software has taken place. When the telephone is activated (or software is requested), the tuner replaces itself, i.e. a customized tuner is downloaded.

Figure 4:
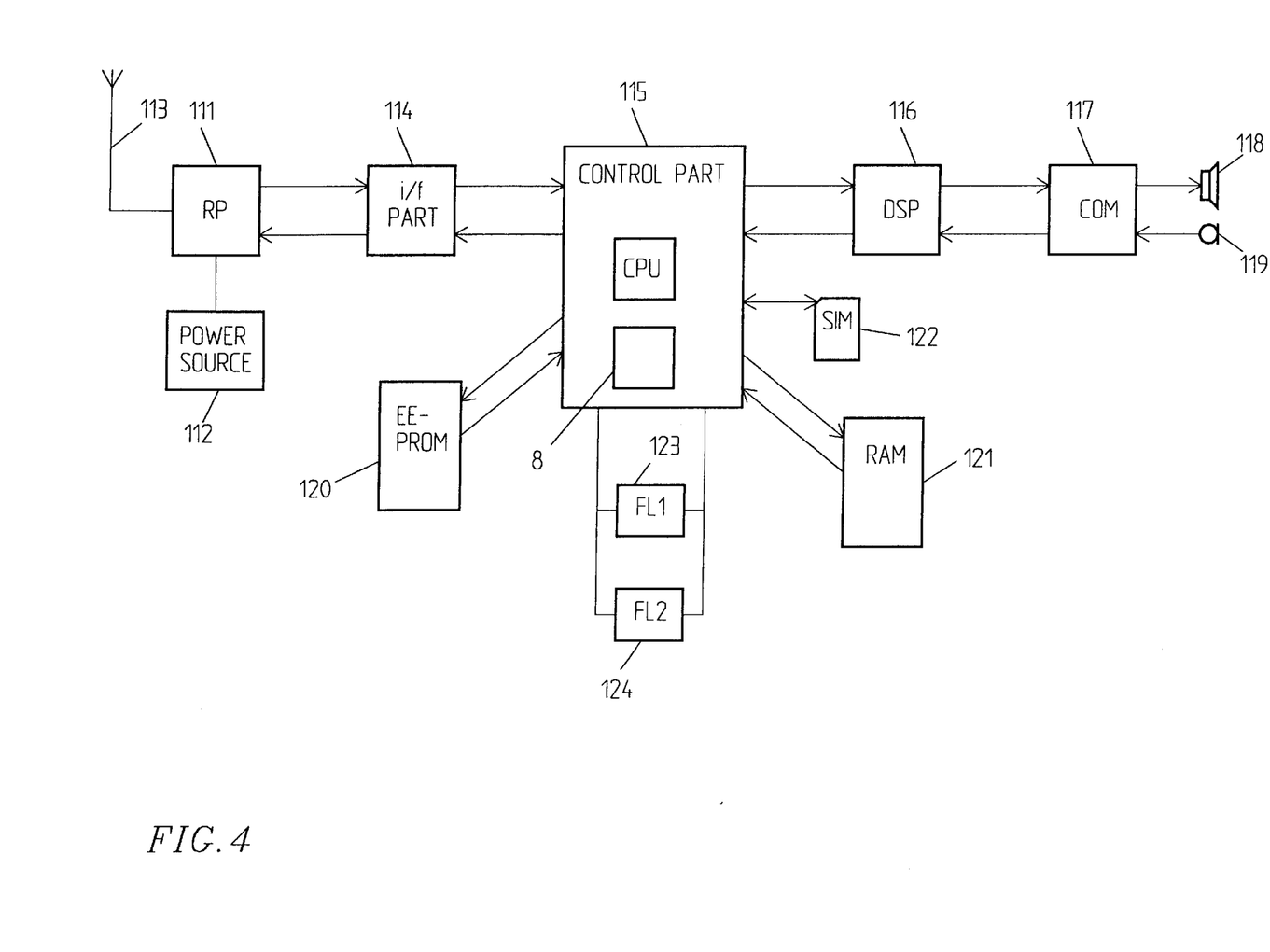
FIG. 4 is a schematical block diagram of a cellular telephone according to the invention, FIG. 5 schematically illustrates the implementation of the inventive concept in a GSM system, FIG. 6 schematically illustrates an implementation of the inventive concept for mixed, e.g. incompatible cellular communication systems.

In FIG. 4 a schematical block diagram of a cellular telephone is illustrated with a radio part 111 which in a manner known per se includes receiving and transmitting means for receiving and transmitting radio signals and to which an antenna, 113, is connected. The transmitting means and the receiving means share the antenna 113 in time multiplex. The radio part 111 also includes means for modulating, demodulating and equalizing in a manner known per se. The radio part 111 is powered from a power source 112. An interface part 114 is also provided including A/D, D/A converters, multiplexing means etc also in a well known manner. The control part 115 comprises encoding, decoding, interleaving means, a PCM interface, a SIM interface communicating with a SIM card 122 etc. and a central processor unit (CPU) etc. The control part, 115, in turn is connected to signal processing means, a digital signal processor (DSP) 116 which is connected to a communication part (COM) 117. The signal processing means 116 among others includes (also in a manner known per se) means for speach encoding/decoding etc. The communication part 117 among others includes PCM encoding/decoding means. It receives speech data from a microphone 119 and sends speach data to a loadspeaker 118 respectively and it communicates with the microprocessor of the control part 115. Basic storing means (SM) 120 e.g. an EEPROM (Electrical Erasable PROM) are provided as well as a RAM (Random Access Memory) 121. It should however be clear that this is merely an example on an implementation. The functioning of the cellular telephone as such will not be further described herein since it is known per se and it may use different access techniques such as time division multiple access (TDMA), code division multiple access (CDMA) or frequency division multiple access (FDMA) etc.

However, according to the present invention additional processing means 8 is provided for execution of downloaded software. In an advantageous embodiment said program processing means comprises a JAVA chip. In the illustrated embodiment two flash memories FL1, FL2, 123, 124, are provided for redundancy reasons. The downloaded software (in a particular embodiment so called Castanet tuners etc.) are stored in one of the flash memories 123, 124. Thus, conventional processing means are provided for the conventional managing of the telephone whereas separate processing means, (program processing means 8) are provided for handling downloaded software. In an alternative embodiment common processing means are used for both functionalities.

As an alternative to an EEPROM or flash memories for storing of downloaded software etc. the SIM-card can be used (Subscriber Identity Module). This is an advantageous embodiment since the user then can change telephone (i.e. use the same SIM) without having to download software. Thus, in this way software related to the user/subscriber in a simple way can be moved from one communication unit to another without the user having to repeat the downloading procedure.

Figure 5:
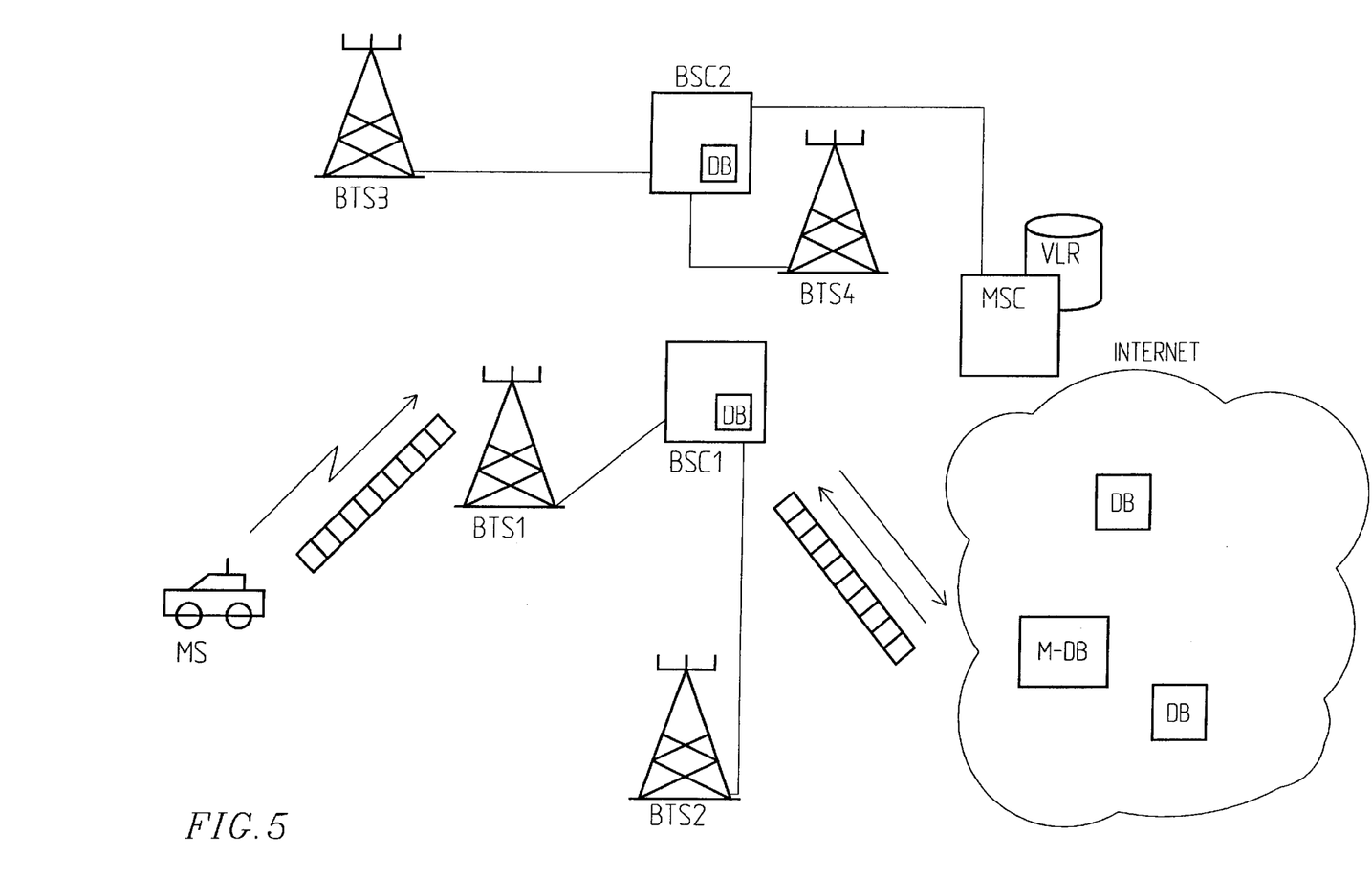

FIG. 5 very schematically illustrates a part of a GSM-system. Base Transceiver Stations BTS1 and BTS2 are connected to a base station controller BSC1 whereas BTS3 and BTS4 are connected to BSC2. BSC1 and BSC2 are both connected to MSC/VLR. When mobile station MS is activated, it finds the closest base station which in this case is BTS1 Actually it does not have to be the closest base station but rather the base station with which the signalling transmission is the best. As referred to earlier in the application the mobile station MS is generic comprising only basic software and it may have been fabricated anywhere. A channel is set-up between MS and BTS1 supporting transfer of software. BSC1 provides the location information of BTS1 and a channel for transfer of software over a global data communications network, here Internet, available in one or more databases, is set-up. Software relates to basic functionality as well as services, applications and new software etc. as discussed above. A replicated database may be provided in BSC1. In handling means provided in the mobile station, the downloaded software is processed. The software, e.g. customized basic software is downloaded to software storing means, e.g. a flash memory as discussed above with reference to FIG. 4.

Figure 6:
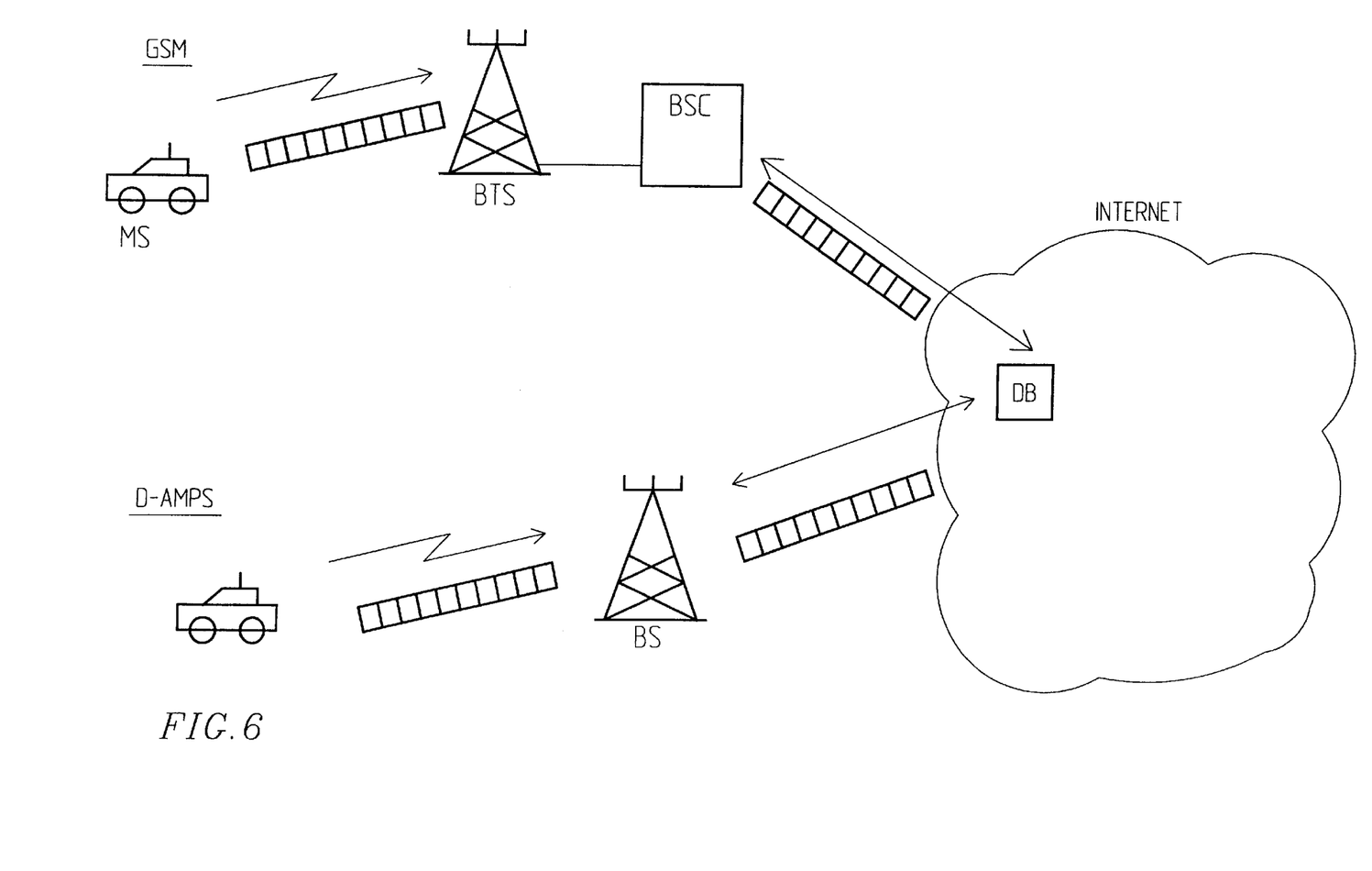

FIG. 6 is a figure similar to that of FIG. 5 with the difference that two different cellular communication systems, namely GSM and D-AMPS are illustrated. The cellular communication systems are merely given for exemplifying reasons, the concept applies to other alternatives such as for example ADC, PDC, PCS, DCS 1800, DCS 1900 as well. The figure is merely included to illustrate the principle that different communication networks communicating with different frequencies, protocols etc. can use the same principle and the same source for providing a generic telecommunication unit with customized basic software. Furthermore basic software can be updated automatically or via user interaction. Different services, updates, applications etc. are available in one and the same manner, using one and the same global data communications network irrespectively of which is the mobile communications network. Both for GSM and for D-AMPS location information is provided in the base station (BSC and BS respectively) and channels are setup for transfer of software.

Figure 7:
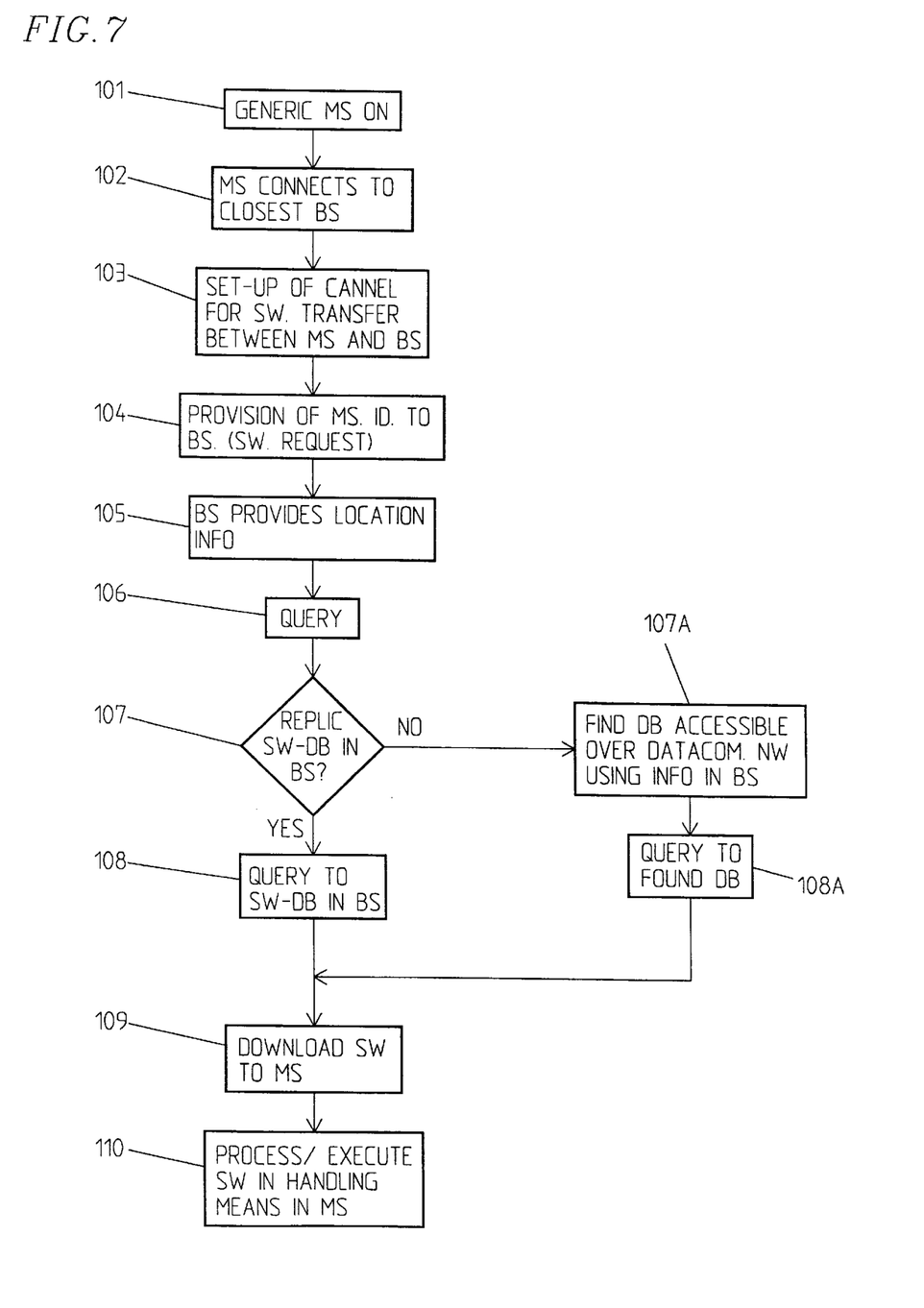
FIG. 7 is a flow diagram illustrating downloading of customized basic software using the pull technique.

FIG. 7 is a schematical flow diagram illustrating the downloading of basic functionality software to a generic mobile station including handling means for program execution. The generic mobile station is switched on, 101, and finds the closest base station, to which it connects, 102. A channel for software transfer is setup between the mobile station and the base station, for example TCP/IP comprising a file transfer protocol, 103. According to another example a Castanet™ ADP protocol is setup. Other alternatives are also possible. The mobile station then provides the base station with information relating to its identity (IMSI, PIN) and possibly also some additional information, including a software request, 104. According to one embodiment a software request is automatically provided the first time the generic telephone is activated. Alternatively some kind of user interaction is needed. The base station then provides information about its location, 105. A software query is then provided, 106. An examination is performed to establish whether the base station comprises a replicated software database, 107. If a replicated software database is provided in the base station, the query is directed to said local software database in the base station, 108. If no local software database is provided in the base station, an appropriate "global" database is found using information provided in the base station for example in a table or similar, 107A. The query is then transferred to said "global" data base, 108A. Using the software transfer protocol, software is downloaded to storing means in the mobile station, 119, and in the handling means in the mobile station the program code is executed and the software is activated, 110. The generic mobile station has thus been provided with customized basic functionality also called front-end functionality as discussed earlier in the application which for example may consist in that it is provided in the language used locally around the base station. Other local adaptations are advantageously also provided for.

Figure 8:
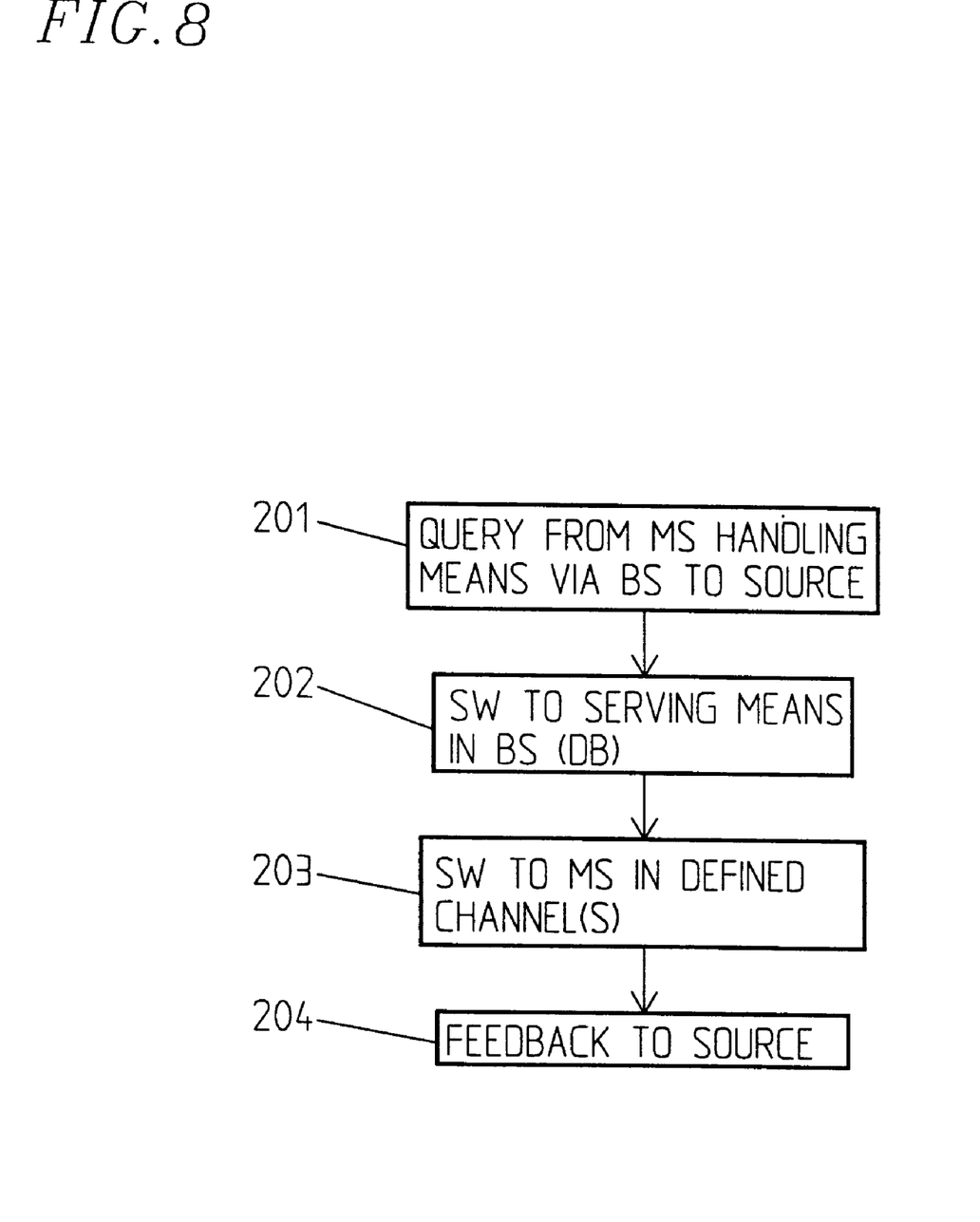
FIG. 8 is a flow diagram illustrating downloading of updating software, new software or software relating to services subscribed to etc.

FIG. 8 is a very schematical flow diagram illustrating one way of downloading software to a mobile telephone which already has been provided with customized basic functionality, e.g. as described under reference to FIG. 7. Alternatively the concept is applied to a telephone which has been provided with customer adapted functionality in any convenient or conventional manner.

It is here supposed that the handling means of a mobile station MS comprises serving (tuning) means enabling reception of one or more channels. In an advantageous embodiment, as referred to above, a Castanet tuner has been downloaded. A query is provided, 201, by the handling means via the base station to the source, for example a Castanet transmitter. Via transmitting means software is then provided to serving (storing) means e.g. a Castanet proxy, provided in the base station, 202, using the software transfer protocol. The software is then provided to the mobile station in the channels defined in its tuning means, for example a Castanet tuner, 203. Feedback information can be provided to the source, 204, i.e. the transmitter or the producer.

Figure 9:
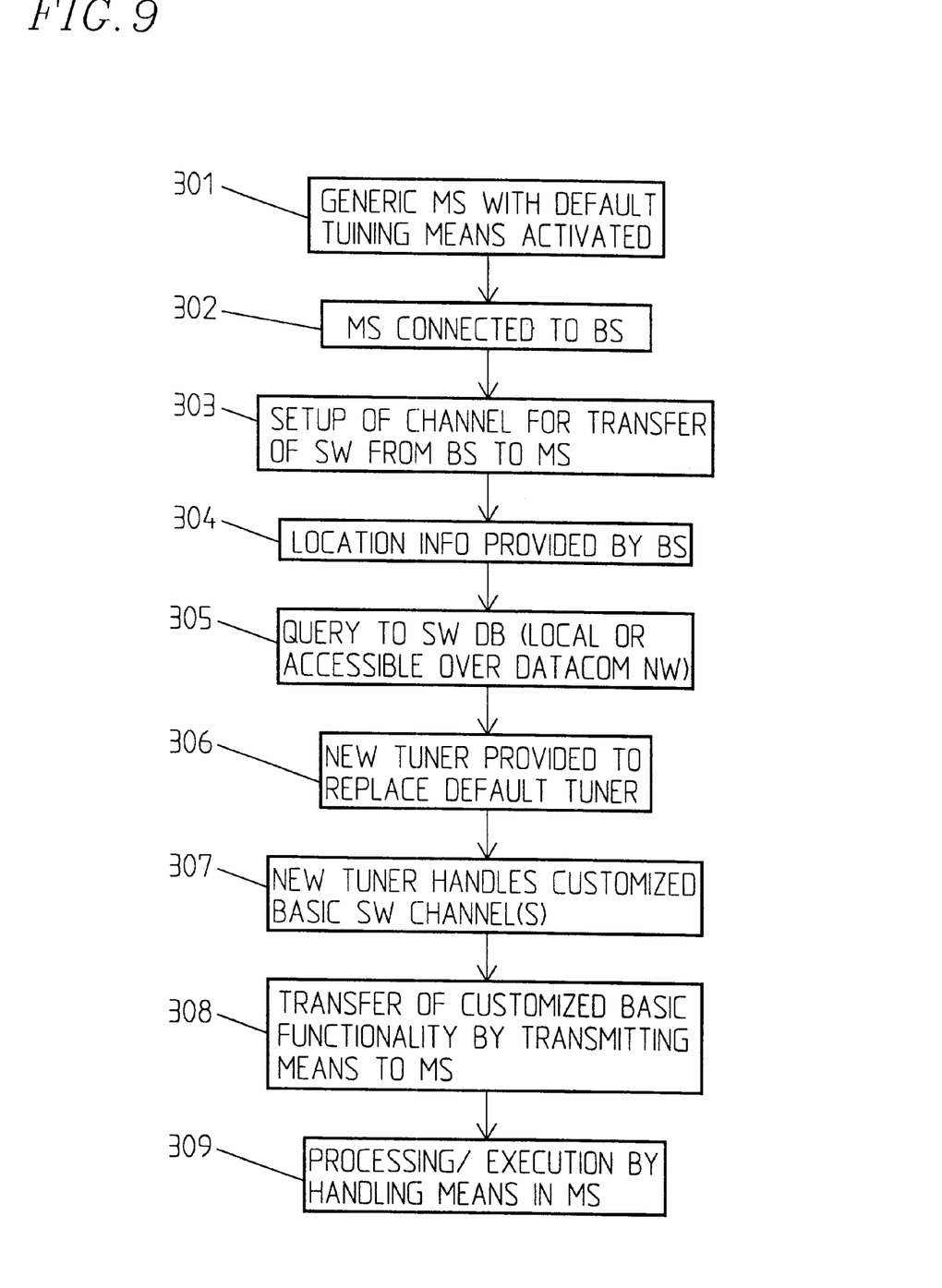
FIG. 9 is a flow diagram illustrating downloading of customized basic software using the push technique.

FIG. 9 is a flow diagram schematically describing the embodiment described with reference to FIG. 3. It is supposed that a generic mobile station (MS) is provided with preprogrammed tuning means, e.g. it contains a default Castanet tuner. As in FIG. 7, when the mobile station is activated, 301, it is connected to the "closest" base station, 302. A channel for transfer of software is setup between the mobile station and the base station and identification information is provided to the base station, 303. The base station then provides location information describing its location, 304, and a query is sent to a software database accessible via the data communications network or provided locally in the base station, 305. A new tuner is then "built" or fetched from a DB using the location information provided by the BS and the information provided by the MS, to replace the default tuner initially provided in the mobile station, 306. The new tuner then starts handling one or more customized basic software channels (e.g. Castanet channels), 307. The adaptation information is thus in this embodiment provided by the base station and it contains the channels to which the mobile station subscribes. Customized basic functionality is transferred by transmitting means to the mobile station automatically, 308. The customized basic functionality is then processed in the handling means of the mobile station, 309. For updating of basic functionality as well as customized basic functionality, applications, services, new software etc. the principle as described with reference to FIGS. 2 and 8 apply.

It is an advantage of the invention that the manufacturing costs are reduced. Still further the manufacturing time is reduced. Another advantage is that the storing of telecommunication units is more efficient: "just in time". Yet another advantage is that "the time to market" and "the time to customer" are considerably reduced. More services can be provided as well as more advanced services and the software is always up-to-date.

What is claimed is:

1. A system for customizing wireless communication units for use in a wireless communication system including a number of switching arrangements arranged throughout the coverage area of the wireless communication system, each wireless communication unit comprising means enabling establishment of contact with a switching arrangement, wherein each communication unit is generic and comprises handling means with program executing means; software relating to wireless communication units being provided in a number of storing means accessible over a global data communications network, each generic communication unit including indicating means for communicating a switching arrangement, with which contact is established, that software is requested; the switching arrangement or communication means connected thereto providing information relating to the location of the communication unit, and using said location information, for downloading software relating to a particular generic communication unit via said switching arrangement or communication means using said global data communications network to said communication unit.

2. The system of claim 1, wherein the storing means comprises a plurality of databases including at least a master data base.

3. The system of claim 1, wherein at least a plurality of communication means or switching arrangements comprise local storing means for locally holding software replicated from the database(s).

4. The system of claim 3, wherein when software is requested, a channel for transfer of software is set-up between the communication unit and the switching arrangement, software being transferred from replicated, local storing means to the communication unit.

5. The system of claim 1, wherein said indicating means are included in communication unit activating means, the first time a communication unit is activated, software automatically being requested.

6. The system of claim 1, wherein an indication that software is requested by a communication unit is provided through user interaction.

7. The system of claim 1, wherein the switching arrangement is a base station.

8. The system of claim 7, wherein when a communication unit is activated, contact is established with an adjacent base station which provides information relating to the location of the base station itself, said information being indicative of the location of the communication unit, so that when contact is established between the communication unit and the base station, information about communication unit identity is provided to the base station.

9. The system of claim 8, wherein a channel for transfer of software is set-up between a communication unit and a switching arrangement, when software is requested, a software transferring channel being provided between the switching arrangement and a database containing software.

10. The system of claim 9, wherein a software transferring protocol is used for transferring software to the communication unit.

11. The system of claim 9, wherein the switching arrangement at least if it does not comprise/communicate with local information holding means, holds information about a number of databases for routing a query to an appropriate database relating to the software request of a communication unit.

12. The system of claim 1, wherein the global communication network is the Internet.

13. The system of claim 1, wherein the pull technique is used for loading down customized basic software to the communication unit.

14. The system of claim 1, wherein an application comprising generic tuning means is downloaded to the communication unit, said application receiving and managing applications and/or content to be delivered using said global data communication network and which via a default procedure automatically is selected by the communication unit user.

15. The system of claim 14, wherein selected software applications/content are provided to the communication unit using push technique.

16. The system of claim 15, wherein generic tuning means comprising a Castanet tuner or similar is automatically downloaded to storing means of the communication unit.

17. The system of claim 1, wherein the handling means comprising executing means is a JAVA™ chip.

18. The system of claim 17, wherein in the switching arrangement serving information holding means is arranged, and transmitting means and a number of repeaters distributing and managing channels towards the communication unit.

19. The system of claim 1, wherein generic, default tuning means are provided in the communication unit, the push technique being used for downloading customized basic functionality software as well as updating, new, application, service software to the communication unit.

20. The system of claim 19, wherein the default tuning means comprises a Castanet tuner, customized tuning means being downloaded to replace the default tuning means when software is requested.

21. The system of claim 1, wherein the generic communication unit includes basic functionality, front-end functionality basic functionality being automatically dynamically updated/upgraded/modified using software downloading from the global data communication network.

22. The system of claim 1, wherein the JAVA-programming language is used, services being downloaded as JAVA applets.

23. A communication unit comprising basic functionality including means for establishing contact with a switching arrangement, wherein the communication unit is generic and comprises handling means including processing means for program execution, customized basic functionality being downloaded to the communication unit via a global datacommunications network using location information provided by the switching arrangement with which contact is established, for providing customized basic software.

24. The communication unit of claim 23, wherein basic and customized basic functionality is dynamically updated via said global datacommunications network, applications, services, as well as new software being downloaded to the communication unit automatically.

25. The communication unit of claim 23, wherein basic and customized basic functionality is dynamically updated via said global datacommunications network, applications, services, as well as new software being downloaded to the communication unit via user interaction.

26. The communication unit of claim 23, wherein the handling means comprises a Java chip, Castanet tuners being downloaded to storing means provided in the communication unit.

27. A method of customizing a communication unit for use in a mobile communication system, which comprises the steps of:

establishing contact between the communication unit which is generic and a switching arrangement of the mobile communication system, including a request for software, setting up a communication channel between the communication unit and the switching arrangement for transfer of software, providing location information relevant to the generic communication unit, via said switching arrangement loading down software to said communication unit over a global data communication network using said location information.

28. The method of claim 27, further comprising the step of:

providing a request for software the first time the communication unit is activated.

29. The method of claim 27, wherein the pull technique is used for downloading of customized basic software to the communication unit.

30. The method of claim 28, wherein the push technique is used at least for dynamical (automatic) downloading of updated/modified software.

31. The method of claim 27, wherein push technique is used for downloading software to the communication unit, basic functionalities initially provided in the telephone automatically and dynamically being updated/modified/replaced using the push technique.

* * * * *